United States Patent [19]

Allain et al.

[11] 4,195,070

[45] Mar. 25, 1980

[54] PREPARATION OF A MGCL$_2$ SOLUTION FOR NALCO'S MGCL$_2$ PROCESS FROM MGSO$_4$ AND OTHER MGSO$_4$ SALTS

[75] Inventors: Ronald J. Allain, Richmond, Tex.; David G. Braithwaite, Golf, Fla.; Joseph P. Maniscalco, Sugarland, Tex.

[73] Assignee: Nalco Chemical Company, Oak Brook, Ill.

[21] Appl. No.: 22,397

[22] Filed: Mar. 21, 1979

[51] Int. Cl.$^2$ .......................... C01F 5/34; C01D 5/10; C01D 5/18

[52] U.S. Cl. .................................. 423/498; 423/163; 423/166; 423/199; 423/552; 423/553

[58] Field of Search .................. 203/12, 14, 56, 64; 423/170, 155, 166, 162, 163, 199, 208, 497, 498, 552, 553

[56] References Cited

U.S. PATENT DOCUMENTS

| | | | |
|---|---|---|---|
| 2,295,257 | 9/1942 | Butt | 423/163 |
| 3,423,171 | 1/1969 | Hoppe | 423/163 |
| 3,966,888 | 6/1976 | Braithwaite | 423/498 |
| 3,983,224 | 9/1976 | Allain | 423/498 |

*Primary Examiner*—Brian E. Hearn
*Attorney, Agent, or Firm*—John G. Premo; Robert A. Miller

[57] ABSTRACT

A method of beneficiating a mixed salt mineral ore containing potassium and magnesium sulfates and/or their hydrates which allows the recovery of anhydrous magnesium chloride and the simultaneous recovery of commercially acceptable potassium sulfate.

5 Claims, No Drawings

PREPARATION OF A MGCL₂ SOLUTION FOR NALCO'S MGCL₂ PROCESS FROM MGSO₄ AND OTHER MGSO₄ SALTS

INTRODUCTION

In the process of manufacturing magnesium metal, the electrolysis of anhydrous magnesium chloride in a molten salt eutectic is normally practiced. The magnesium metal is separated from the bath and electrolysis cell by flotation in molten baths that contain primarily $MgCl_2$, $KCl$, and $NaCl$ along with additional $CaCl_2$ salts. Other eutectic "mixed" salt baths used to recover magnesium metal have included molten baths containing $MgCl_2$—$LiCl$ mixtures with other salts such as $KCl$, $BaCl_2$, $NaCl$, and $CaCl_2$. Various types of trace metal such as vanadium, salts may be added to the mixed baths to enhance their electrolysis characteristics.

One of the more profound difficulties found in operating an electrolysis procedure to manufacture magnesium metal is the build up of cell "smut", which is primarily magnesium oxides, in the salt bath. This "smut" is not soluble in the eutectic molten baths and accumulates on electrodes, in flow paths, and generally throughout the equipment in contact with the molten salt bath. The presence of this "smut" is harmful to the electrolysis cell operation. It's presence is caused primarily by insufficiently dried magnesium chloride which is used as a cell feed during continued electrolysis.

Recently, new procedures have been developed to obtain high quality anhydrous magnesium chloride. These processes are described in U.S. Pat. No. 3,983,224 and in U.S. Pat. No. 3,966,888 both issued to Allain, et al. The patents issued to Allain, et al, describe a process which successfully manufactures extremely high quality anhydrous $MgCl_2$ from $MgCl_2$ hydrate salts or concentrated $MgCl_2$ aqueous solutions. These starting materials are admixed with ethylene glycol, exposed to temperatures sufficient to distill from these admixtures all water initially present leaving an anhydrous ethylene glycol solution of $MgCl_2$. This anhydrous ethylene glycol-$MgCl_2$ solution is treated with anhydrous ammonia forming the insoluble $MgCl_2 \cdot 6NH_3$—hexa ammoniate salt which precipitates and is then filtered from this glycol—$MgCl_2 \cdot 6NH_3$ slurry. Subsequent unique washing steps, solvent recovery steps, and a final roasting process which drives off ammonia (for recycle) and recovers high quality $MgCl_2$ (anhydrous) completes the process.

One of the difficulties of the economic operation of the above process is the source of the $MgCl_2$ hydrate salts or concentrated solutions. Brines, bitterns, and even sea water may be used to recover these hydrated $MgCl_2$ salts or concentrated aqueous solutions. It would be beneficial to also use various types of naturally occurring mineral ores or mixed salts containing magnesium values if a process could be found to simply and economically convert these mineral ores and mixed salts to anhydrous $MgCl_2$.

We have discovered that we can easily achieve the beneficiation of certain ores and mixed salts containing magnesium values, and by such beneficiation open up many geographic locations to possible economic consideration as sites to manufacture $MgCl_2$ (anhydrous) and possibly even magnesium metal. We have particularly discovered a process to convert the $MgSO_4 \cdot K_2SO_4$ double salt to $MgCl_2$ (anhydrous) and fertilizer grade $K_2SO_4$ using a relatively simple process. We have also discovered a procedure to provide anhydrous $MgCl_2$ of sufficient quality to act as electrolysis cell feed for the manufacture of magnesium metal from a mixed salt containing $MgSO_4 \cdot K_2SO_4$.

THE INVENTION

We have discovered a method of beneficiating a mixed salt mineral ore containing potassium and magnesium sulfates and/or their hydrates which allows the recovery of anhydrous magnesium chloride and the simultaneous recovery of commercially acceptable potassium sulfate. This beneficiation of these mixed salt mineral ores allows the separation and isolation of two critical and economically valuable salts. These two salts are anhydrous magnesium chloride and potassium sulfate. This method of the beneficiation of these mixed salts containing potassium and magnesium sulfates comprise the following steps:

(a) Dissolving the mixed double salt containing magnesium and potassium sulfate in water at a temperature between 50° C. and 90° C. and then filtering the insoluble residue from the solution;

(b) Adding to and dissolving into the filtered solution of step (a) a molar equivalent to potassium chloride, the molar equivalent calculated on the basis of the solublized magnesium cation requirement for chloride ion, thereby forming a final solution;

(c) Heating the final solution of step (b) to a temperature within the range of 50° C. and 90° C. for a period of time sufficient to allow chemical equilibrium to be established, thereby forming an equilibrated solution;

(d) Adding sufficient ethylene glycol to the equilibrated solution of step (c) to fully dissolve all magnesium chloride calculated to be present in that solution, then removing from the ethylene glycol-water solution the potassium sulfate which precipitated on the addition of said ethylene glycol;

(e) Distilling water from the solution of step (d) thereby forming an anhydrous magnesium chloride solution in ethylene glycol and an anhydrous precipitate of potassium sulfate, then removing said $K_2SO_4$ precipitate from said solution;

(f) Combining the potassium sulfate precipitates of steps (d) and (e) and washing said combined precipitates with sufficient water (maintained below 70° C.) to remove entrained ethylene glycol, and recovering the washed potassium sulfate;

(g) Treating the anhydrous magnesium chloride solution in ethylene glycol formed in step (e) with anhydrous ammonia to form a magnesium chloride ammonia complex which precipitates from the ethylene glycol solution;

(h) Removing the complex precipitate from the ethylene glycol and washing it with a low boiling solvent for ethylene glycol to remove any ethylene glycol entrained in the precipitate;

(i) Heating the magnesium chloride ammonia complex to drive off ammonia leaving as a finished product completely anhydrous magnesium chloride.

The sequence of steps outlined in the previous paragraphs allows for the production of anhydrous magnesium chloride of sufficient quality to be used as cell feed in an electrolysis cell recovering magnesium metal. In addition it also allows the recovery of potassium sulfate of sufficient quality to be used in commercial grade fertilizers.

Another operation that is preferred in this invention is the simultaneous dissolution and exchange reactions that occur when the mixed magnesium and potassium sulfates mineral ores previously mentioned are added to a mixture of water and glycol. This mixture is then stirred and maintained at a temperature between 50° C. and 90° C. for a period of time sufficient to dissolve the mixed double salt magnesium and potassium sulfates.

To this mixture, after removal of any insoluble residues, either by filtration, centrifigation, or any other technique commonly used to separate solids from liquid solutions, is added sufficient potassium chloride to provide enough chloride ion to provide a molar equivalent of chloride ion for the solubilized magnesium cation present in this mixed solution. The rate of the dissolution of the added potassium chloride is enhanced by increasing the temperature to at least 50° C. A period of time sufficient to allow chemical equilibration has been found to be at least 15 minutes at these temperatures. After chemical equilibration has been established in this solution mixture, any residual precipitates are removed by common solid-liquid separation procedures. These precipitates contain primarily potassium sulfate. At this point the mixture is dehydrated by a distillation process such that the final solution derived following this distillation process is a mixture of an anhydrous potassium sulfate solid precipitate in a solution of anhydrous $MgCl_2$ in ethylene glycol.

Again the anhydrous potassium sulfate is removed from this mixture, washed with cold water to recover ethylene glycol, and isolated for sale as a fertilizer. The remaining anhydrous magnesium chloride in ethylene glycol is treated as above, that is, by addition of anhydrous ammonia, separation of the magnesium chloride-ammonia complex from the ethylene glycol, washing the anhydrous magnesium chloride complex precipitate with a low boiling solvent for ethylene glycol to remove the ethylene glycol entrained in this precipitate, and finally heating the $MgCl_2$ ammonia complex to drive off and recover the ammonia and leave as a finished product a completely anhydrous magnesium chloride.

The Mixed Salts

The mixed salts of magnesium sulfate and potassium sulfate are found in various locations throughout the world. An example of these salts are the mineral ores called Langbeinite, Leonite, Schoenite, and Picromerite. The Langbeinites are often given the formula $K_2SO_4.2MgSO_4$. Leonite on the other hand is a tetrahydrate having the formula $K_2SO_4.MgSO_4.4H_2O$. The hexahydrate salt, $K_2SO_4.MgSO_4.6H_2O$, is referred as Schoenite. The Picromerite is another mineral name given to a magnesium potassium sulfate ore that is commercially mined.

In the practice of this invention, the source of the mixed salts is not particularly important. It is, however, important that the minerals used as raw materials be somewhat free of impurities. However, it has been found that by following the procedures outlined previously, even these impurities can be precipitated and isolated from the products of these reactions. The impurities normally would be isolated either by initial filtration of a water solution, by the second filtrations or solids isolation following the first addition of glycol to the water solution, or finally isolated following the total dehydration step leading to the magnesium chloride glycol solutions mentioned above.

The reactions mentioned above are limited to those solutions that contain water. A demonstration of this is found in an attempt to accomplish the above reactions and the above beneficiation of the mixed salts containing potassium and magnesium sulfates by the procedures outlined above in totally anhydrous and non-aqueous solvent systems. Those solvent systems checked included methanol, acetone, ethylene glycol, the diethylether of tetraethylene glycol, and tetraethylene glycol. Without the presence of water, no metathetical exchange reactions occurred that would be of more than nominal interest. The organic solvent systems mentioned above were checked both as is and in the presence of aqueous mixtures. There was no reaction between the potassium chloride and the minerals containing potassium and magnesium sulfate in the organic solvents as is. Water had to be added for the metathetical exchange reactions to occur. However, those reactions made using the solvent as an aqueous solution provided no additional benefit to the metathetical reactions or their rates that occurred when using only an equivalent amount of water. The presence of the organic compounds were not found to enhance the metathetical exchange reaction rates.

Various additives were used, and none used seemed to improve the yield or the final brine concentration. The addition of small amounts of polyacrylic acid, ammonium chloride, magnesium chloride, sodium chloride, and calcium chloride had no effect on the extent of the metathetical reaction or the rate of the metathetical reactions. Trace amounts of inorganic acids, such as sulfuric acid and hydrochloric acid, seemed to depress the extent of the reaction as well as the rate of the metathetical exchange reactions.

From the work that we have completed, it would appear that the potassium sulfate formed by the metathetical reactions outlined above or initially present in the mixed salts must be removed from the solution as the reaction proceeds to allow the maximum degree of this metathetical reaction to occur.

EXAMPLES

A typical example of the beneficiation of the mixed double salt containing magnesium sulfate and potassium sulfate is outlined below.

29.5 grams of a double salt which analyzed as containing 10.7% magnesium and 18.2% potassium, the remainder being sulfate and trace quantities of other salts, was added to 60 grams of water and heated to 80° C. This mixture was stirred and allowed to dissolve (approximately 5 min.). To this mixture was added 14.9 grams of potassium chloride followed by additional stirring and heating. A reaction time and equilibration time of from 3 to 10 minutes was allowed. This mixture was then filtered to accomplish a removal of insoluble salts. To the filtrate was added 90 grams of ethylene glycol. This mixture was then heated until the water began to distill from these mixed solutions. As the water is removed, anhydrous potassium sulfate precipitates from the solution remaining. The distillation is complete when no further water can be removed from the solution mixture remaining. At that time the entire amount of potassium sulfate initially present has precipitated and the remaining solution is composed of anhydrous magnesium chloride in ethylene glycol. This anhydrous solution of magnesium chloride in glycol is recovered through a filtration or any solids-liquid separation technique of choice while simultaneously recovering the glycol wetted potassium sulfate precipitate. The potassium sulfate precipitate is given a cold water wash (temperatures are maintained below 70° C.) and analyzes at a sufficient quality to be sold as a potassium sulfate fertilizer. The $MgCl_2$ solution in ethylene glycol is exposed to anhydrous ammonium chloride which precipitates the $MgCl_2$ as a complex whose formula is thought to be $MgCl_2.6NH_3$. This $MgCl_2$ ammonia precipitate is removed from the glycol solution, washed with a solvent for ethylene glycol that is a low boiling solvent, and then heated to temperatures that are sufficient to drive off the complexed ammonia. These reactions to isolate the anhydrous $MgCl_2$ from the $MgCl_2$ ammonia complex are outlined in U.S. Pat. Nos. 3,983,244 and 3,966,888.

Additional work was done which allowed the definition of reactions which would lead to a higher concentration of $MgCl_2$ in both the initial brines as well as the ethylene glycol-$MgCl_2$ brines. The summary of the reactions are given in Table I. This table will outline the amount of double salt reaction with KCl, the amount of water and ethylene glycol used in the reaction, the temperatures of the reaction, the extent of the metathetical exchange, and the effects of any added salts such as magnesium chloride, sodium chloride and calcium chloride.

salt, unreacted potassium chloride, and the potassium sulfate product derived from the metathetical exchange reaction that would be present in the precipitates in the previously described process steps could be recycled back to earlier process steps and still derive the benefits of the invention.

Having described the invention by Example as well as description, we claim:

1. A method for the beneficiation of mixed salts containing potassium and magnesium sulfates which allows the recovery of anhydrous $MgCl_2$ and the recovery of potassium sulfate, said method comprising the steps:
   (a) Dissolving a mixed double salt containing magnesium and potassium sulfates in water at a temperature between 50° C. and 90° C. and then filtering the residue from the solution;
   (b) Adding to and dissolving into the filtered solution of (a), a molar equivalent of potassium chloride, the molar equivalent calculated on the solubilized magnesium cation requirement for chloride ion, thereby forming a solution;
   (c) Heating the solution produced in step (b) within the range of 50° C.–90° C. for a period of time to allow equilibrium to be established, thereby forming an equilibrated solution;
   (d) Adding sufficient ethylene glycol to the equilibriated solution of (c) to fully dissolve all $MgCl_2$ calculated to be present, then removing from solution the $K_2SO_4$ which precipitated on the addition of said ethylene glycol;

TABLE I

| $MgSO_4 . K_2SO_4$ Double Salt Grams | KCl Grams | $MgCl_2 . 6H_2O$ Grams | NaCl Grams | $CaCl_2 . 2H_2O$ Grams | Water Grams | Ethylene Glycol Grams | Remarks |
|---|---|---|---|---|---|---|---|
| 25 | | | | 16 | 100 | | 5.7% $MgCl_2$ solution |
| 25 | | | | 16 | | 100 | Very little reaction; Mg = 0.7% |
| 50 | | | | 32 | 100 | 500 | 50% Mg reacted |
| 25 | | | | 16 | | 250 | Mg = .28% |
| 25 | | | | 16 | 70 | 250 | 70% Mg reacted |
| 25 | 9 | 23 | | | 250 | | 100% reaction; 8.6% $MgCl_2$ solution |
| 25 | 9 | 23 | | | 125 | | 100% reaction; 9.9% $MgCl_2$ solution |
| 25 | 18 | 5 | | | 150 | | 100% reaction; 6.8% $MgCl_2$ solution |
| 25 | 18 | 23 | | | 150 | | 100% reaction; 8.6% $MgCl_2$ solution |
| 25 | 18 | 5 | | | 50 | 150 | No reaction |
| 25 | 18 | 23 | | | 50 | 150 | No reaction |
| 25 | 18 | 23 | | | 190 | | 100% reaction; 10% $MgCl_2$ solution |
| 25 | | | 12 | | 200 | | 100% reaction; 6% $MgCl_2$ solution |
| 25 | | | | | 60 | | 50% reaction; 9% $MgCl_2$ |
| 29 | 15 | | 12 | | 200 | | 100% reaction; 4.9% $MgCl_2$ |
| 29 | 30 | | | | 200 | | 100% reaction; 4.1% $MgCl_2$ |
| 25 | | | 12 | | 200 | | 100% reaction; 5% $MgCl_2$ |
| 29 | 15 | | 8 | | 100 | | 100% reaction; 5.5% $MgCl_2$ |
| 29 | 18 | | 1 | | 50 | 150 | 50% reaction |
| 29 | 18 | | 6 | | 50 | 150 | 50% reaction |
| 29 | 18 | 23 | | | 190 | | 20' at 80° C. - 90% reaction |
| 29 | 18 | 23 | | | 190 | | 40' at 80° C. - 100% reaction |
| 29 | 18 | 23 | | | 190 | | 60' at 80° C. - 100% reaction |
| 29 | 18 | | 7 | | 190 | | 20' at 80° C. - 80% reaction |
| 29 | 18 | | 7 | | 190 | | 40' at 80° C. - 100% reaction |
| 29 | 18 | | 7 | | 190 | | 60' at 80° C. - 100% reaction |
| 29 | 18 | 5 | | | 190 | | 20' at 80° C. - 100% reaction |
| 29 | 18 | 5 | | | 190 | | 40 at 80° C. - 100% reaction |
| 29 | 18 | 5 | | | 190 | | 60 at 80° C. - 100% reaction |
| 29 | 15 | | | | 190 | | 10 at 80° C. - 85% reaction |
| 29 | 15 | | | | 190 | | 15 at 80° C. - 100% reaction |
| 29 | 15 | | | | 190 | | 20 at 80° C. - 100% reaction |
| 29 | 15 | | | | 190 | | 40 at 80° C. - 100% reaction |
| 29 | 18 | | | | 50 | 200 | No reaction |
| 29 | | | 13 | | 190 | | 20 at 80° C. - 90% reaction |
| 29 | | | 13 | | 190 | | 40 at 80° C. - 100% reaction |
| 29 | | | 13 | | 190 | | 60 at 80° C. - 100% reaction |
| 29 | 15 | | 13 | | 190 | | 20 at 80° C. - 100% reaction |

Examination of Table I and observations made when attempting to work with more concentrated solutions of the double salt containing $MgSO_4$ and $K_2SO_4$ allow us to conceive of a process that would convert only a portion of the double salt magnesium values to anhydrous $MgCl_2$ in glycol. The portion of unreacted double (e) Distilling water from the solution of step (d) thereby forming an anhydrous $MgCl_2$ solution in ethylene glycol and a precipitate of $K_2SO_4$, then removing said precipitate from said solution;

(f) Combining the $K_2SO_4$ precipitate of steps (d) and (e) and washing said precipitates with sufficient water maintained below 70° C. to remove entrained ethylene glycol, and recovering the washed $K_2SO_4$;

(g) Treating the anhydrous $MgCl_2$ solution in ethylene glycol formed in step (e) with anhydrous ammonia to form a $MgCl_2$ ammonia complex which precipitates from the ethylene glycol solution;

(h) Removing the complex precipitate from the ethylene glycol and washing it with a low boiling solvent for ethylene glycol to remove any ethylene glycol entrained in the precipitate;

(i) Heating the magnesium chloride ammonia complex to drive off ammonia leaving as a finished product completely anhydrous magnesium chloride.

2. In the method of claim 1, the use of a Langbeinite mineral ore as the source of the mixed salts containing potassium and magnesium sulfates.

3. In the method of claim 1, the use of a Leonite mineral ore as the source of the mixed salts containing potassium and magnesium sulfates.

4. In the method of claim 1, the use of Schoenite mineral ore as the source of the mixed salts containing potassium and magnesium sulfates.

5. In the method of claim 1, the use of Picromerite mineral ore as the source of the mixed salts containing potassium and magnesium sulfates.

* * * * *